United States Patent [19]
Ashcraft et al.

[11] Patent Number: 5,247,660
[45] Date of Patent: Sep. 21, 1993

[54] METHOD OF VIRTUAL MEMORY STORAGE ALLOCATION WITH DYNAMIC ADJUSTMENT

[75] Inventors: William J. Ashcraft, Rockville; Grant E. Woodside, III, Ashton, both of Md.; Gerald W. Currington, Reston, Va.; Kenneth A. Robb, Rockville, Md.

[73] Assignee: Filetek, Inc., Rockville, Md.

[21] Appl. No.: 379,257

[22] Filed: Jul. 13, 1989

[51] Int. Cl.⁵ .............................................. G06F 7/22
[52] U.S. Cl. ........................ 395/600; 364/DIG. 2; 364/966.1; 364/966.2; 364/952; 364/952.31; 364/978
[58] Field of Search ............... 395/405, 400, 425; 364/200 MS File, 900 MS File; 360/72.1; 369/32, 54

[56] References Cited

U.S. PATENT DOCUMENTS

| | | | |
|---|---|---|---|
| 4,435,752 | 3/1984 | Winkelman | 364/200 |
| 4,805,097 | 2/1989 | De Sanna | 364/200 |
| 4,849,878 | 7/1989 | Roy | 395/600 |
| 4,912,629 | 3/1990 | Shuler, Jr. | 395/600 |
| 5,029,125 | 7/1991 | Sciupac | 364/900 |
| 5,119,291 | 6/1992 | Flannagan et al. | 395/400 |
| 5,129,088 | 7/1992 | Auslander et al. | 395/700 |

FOREIGN PATENT DOCUMENTS

| | | |
|---|---|---|
| 0325823 | 8/1989 | European Pat. Off. |
| 89-01663 | 2/1989 | PCT Int'l Appl. |

Primary Examiner—Rebecca L. Rudolph
Attorney, Agent, or Firm—Finnegan, Henderson, Farabow, Garrett and Dunner

[57] ABSTRACT

A method of dynamically managing the storage of information in a mass memory of a data processor is described. The mass memory includes a plurality of volumes of write-once media such as optical discs. The method involves grouping the volumes into volume sets, which each contain at least one file set, and dynamically increasing the size of the file sets and volume sets as needed during file storage. Update areas are set aside for each file set for modifications to the original data originally written into that file set. Allocation of storage to allow time-efficient access of files is accomplished by examining storage media characteristics, limits on file set size, and sizes of the data to be written into the file sets. Timers are set to indicate when volumes contain obsolete data and can be removed, when no additional data should be written onto volumes which are not obsolete, and when a volume should be flipped over so the other surface can be filled.

23 Claims, 7 Drawing Sheets

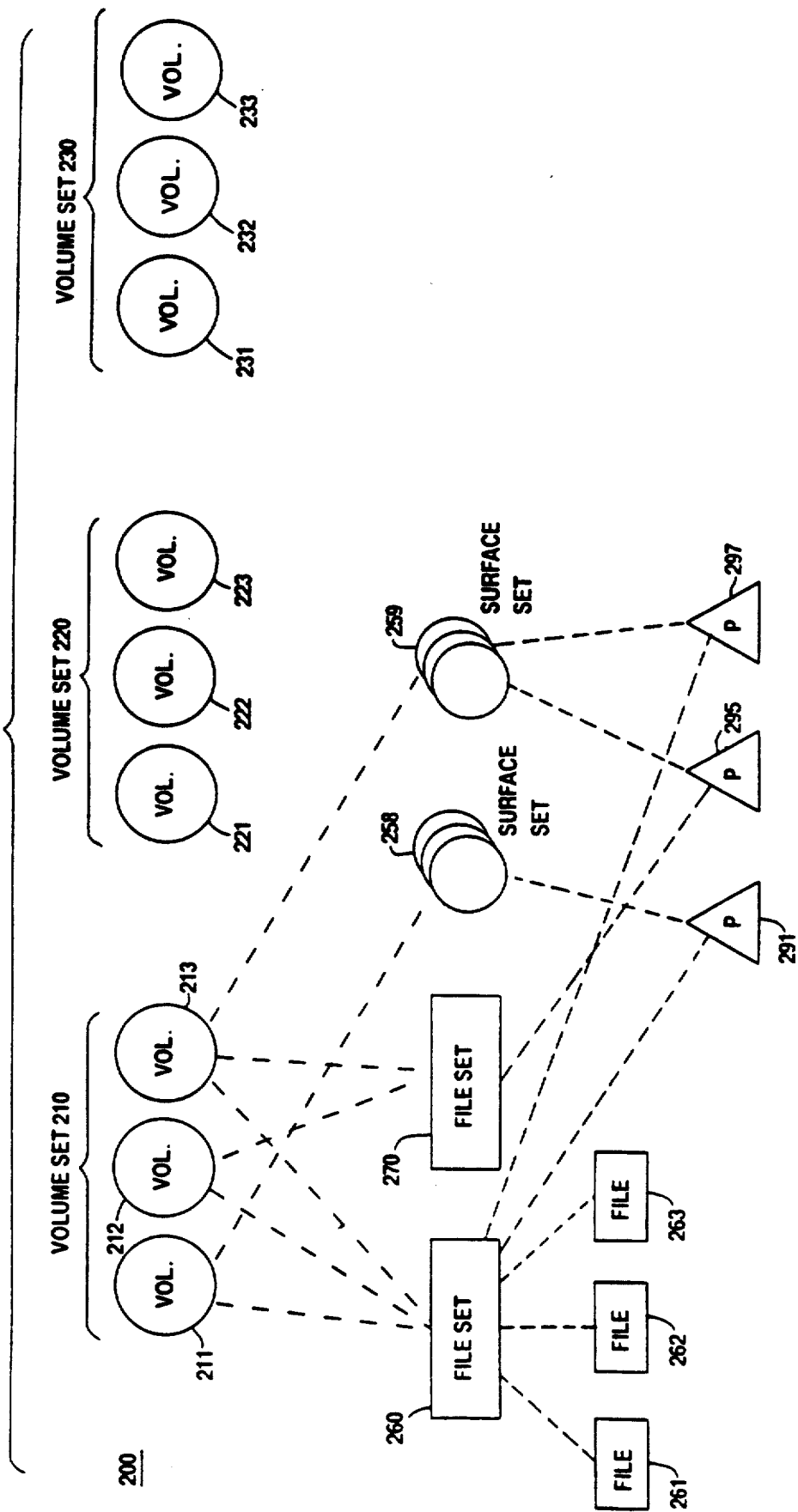

FIG. 5

| DETERMINE D SIZE | SIZE LIMIT | ALLOCATION |
|---|---|---|
| LESS THAN ONE SURFACE | LESS THAN ONE SURFACE | SIZE UP TO SIZE LIMIT |
| LESS THAN OR EQUAL TO ONE SURFACE | EQUAL TO A SURFACE | ONE SURFACE |
| LESS THAN OR EQUAL TO ONE SURFACE | GREATER THAN ONE SURFACE | ONE SURFACE |
| LESS THAN OR EQUAL TO ONE SURFACE | UNSPECIFIED | ONE SURFACE |
| GREATER THAN ONE SURFACE | GREATER THAN ONE SURFACE | SIZE UP TO SIZE LIMIT |
| GREATER THAN ONE SURFACE | UNSPECIFIED | SMALLEST NUMBER OF SURFACES ≥ SIZE |

500

METHOD OF VIRTUAL MEMORY STORAGE ALLOCATION WITH DYNAMIC ADJUSTMENT

BACKGROUND OF THE INVENTION

This invention relates generally to the field of mass storage and specifically to the field of managing memory resources, especially on write-once media, for such storage.

Various techniques have been used to manage memory and memory resources. Some of these techniques are described U.S. patent application No. 136,979, filed Dec. 3, 1987 and now abandoned, and U.S. Pat. application No. 053,823, filed May 26, 1987, now U.S. Pat. No. 4,864,572 issued Sep. 5, 1989, both of which are assigned to the Assignee of this application and of which are incorporated herein by reference. As those applications explain, several problems arise when trying to store very large amounts of data, and many more problems arise when using write-once media, such as optical discs, for storage. One problem is organization, another is accessibility, and a third is limitations of storage space.

Before the advent of optical discs, large amounts of data were often stored on magnetic discs. Early magnetic disc systems were subdivided into small storage compartments or partitions. The size of these storage partitions was determined by physical constraints, such as the sizes of surfaces, tracks, or cylinders, and the partitions all resided within a single disc drive.

Some systems later allowed the operating system to manage the placement of these storage partitions first within a single disc drive and then among several drives. Even in these later systems, however, operators needed to specify partition boundaries. Storage systems eventually evolved which were able to alter the size of these partitions dynamically. This advance led to the development of storage management utilities that rearranged the written storage within the physical media to balance the access load of different magnetic disc drives.

One advantage of systems which had storage partitions defined according to physical specifications was that the loss of a disc drive, whether from failure or regular maintenance, did not prevent the computer system from continuing to run, unless of course the storage on the disc drive contained critical system information. Another advantage was a significant ease in determining what storage was lost while the drive was disabled.

Unfortunately, these systems demanded considerable attention and consumed significant resources whenever space and performance needs changed or whenever the initially estimated requirements were incorrect. In such circumstances, storage allocation and maintenance personnel needed to step in and reallocate storage partitions in such systems. Early IBM systems were estimated to require one storage management person for every ten (10) Direct Access Storage Devices (e.g., discs).

Some of the problems with conventional systems were ameliorated by treating several volumes as a single volume by storage or by management techniques that constantly reconfigured the memory. Other problems have become less important as the reliability of storage devices improved, thereby reducing the need to disable drives for maintenance and repair. These improvements, however, are limited to fixed quantities of storage which can be erased and rewritten, such as magnetic tapes and discs.

Despite these improvements, conventional storage systems are still limited in several respects. For example, storage management systems are not extendable, except for certain tape libraries in very limited applications. Therefore, storage management personnel are required to be intimately involved with data storage decisions.

If the storage system uses write-once media, such as optical discs, the problems are compounded because the magnetic storage techniques which move or adjust storage after it is written cannot be used. There is also much greater overhead, both in performance and space, in updating files on write-once media than on magnetic media. For example, magnetic disc systems usually store only active data; less active data is removed to a different storage for back-up and archives. With write-once media, however, the removal of infrequently used data requires physically removing the volumes on which the data is stored.

In addition, the size of magnetic disc systems is generally fixed. To gain free storage, old files are simply erased. Because write-once files cannot be erased, additional volumes must be added to gain free storage.

Adding new volumes is not without problems. Eventually, the entire system, sometimes called a "volume library," will become full and some of the volumes must be removed. If the storage is not managed wisely, the storage system will be very inefficient and require frequent loading and unloading of volumes.

Write-once storage has additional design constraints not shared by magnetic disc systems. Access to files on write-once media is fairly slow, and thus is most efficiently used with infrequently accessed data. For these reasons, it is important to minimize the management overhead of write-once storage.

The difference in media also manifests itself in the allocation of files into which the data is written. In magnetic disc systems, the location of free storage is not critical because storage can be reorganized to optimize the placement of data even after the data is written. This is especially important when free storage is later at a premium. In the write-once systems, however, the allocation of file storage and placement of the data is critical because generally the data cannot later be moved. Therefore, efficient storage in systems of write-once media requires algorithms which search for and allocate free storage based on detailed knowledge of the media, of the characteristics of the files, of the relationships between files, and of future storage requirements.

The storage allocation difficulties are exacerbated if the stored data is to be modified. In magnetic disc systems, updates are carried out merely by overwriting the file. Most of the time such overwriting requires no additional free storage. In write-once systems, however, files cannot be overwritten, so modifications consume additional storage. Additional problems arise if a file needs to be modified but resides on a volume of write-once media that does not have enough free storage to hold the modifications to that file. In this case, storage must be formed somewhere else in the system, preferably in a location which promotes efficient access.

Another constraint with current optical drive technology is that the two surfaces on each volume cannot be accessed simultaneously. Accessing the surface not currently under the reader requires removal of the disc from the drive, turning it over, and reinsertion. In constrast, most magnetic drives allow multiple surfaces to be read simultaneously.

Finally, it is desirable that concurrent applications be able to use a single write-once memory system. This is a problem because the write-once characteristic makes it difficult to use pointers which magnetic disc systems use to manage multiple applications, and the lifetimes of write-once storage make the use of pointers unattractive.

Therefore, it is an object of this invention to provide a method of managing storage which requires low overhead and which reduces the need for intervention of storage system personnel.

It is another object of this invention to provide a method of efficiently managing files stored on a write-once memory system.

It is a further advantage of this invention to improve the efficiency of storage by taking advantage of characteristics of the data to be stored.

SUMMARY OF THE INVENTION

The present invention overcomes the problems of the prior art and achieves the objects of the invention by providing dynamic management information storage in a mass memory. This involves grouping volumes of storage media into volume sets, which each contain at least one file set, and dynamically increasing the size of the file sets and volume sets as needed during file storage. In addition, update areas can be set aside for each file set for the modifications to the original data initially written into that file set. Allocation of storage to allow time-efficient access of files can be accomplished by examining storage media characteristics, limits on file set size, and sizes of the data to be written into the file sets. Timers can also be added to indicate when volumes contain obsolete data and can be removed, when no additional data should be written onto volumes which are not obsolete, and when a volume should be flipped over so the other surface can be filled.

To achieve the objects in accordance with the purpose of the invention, as embodied and broadly described herein, the method of dynamically managing the storage of information in the mass memory of a data processor in accordance with this invention, the mass memory including a plurality of volumes, comprises several steps performed by the data processor. The steps include grouping selected ones of the volumes into a plurality of nonoverlapping volume sets, each of the volume sets being designed to contain a corresponding set of logically-related data, and organizing each of the sets of data into at least one file set which is designed to contain a logically-related subset of data in that set of data. Each of the file sets resides in the volumes of a corresponding one of the volume sets. Furthermore, the method includes a step of allocating to each of the file sets at least one portion of the volumes in the corresponding volume sets, and storing data into a selected one of the file sets. Finally, this method of dynamic management includes the steps of dynamically increasing the size of the selected file sets during storage of the data by allocating additional portions of the volumes in the volume set corresponding to the selected file set, and dynamically increasing the number of volumes in the corresponding volume set during storage of the data by assigning to the corresponding volume set additional ones of the volumes which have not been previously grouped into one of the volume sets.

A method, in accordance with this invention, of dynamically storing original data and modifications to the original data into file sets stored in a memory system for a data processor, the original data being that data initially written into the file sets, comprises several steps which are performed by the data processor. The first step is assigning a general data area and a corresponding update area to each of the file sets, and the next step is storing the original data only in the general data area of each of the file sets. The other steps are storing the modifications to the original data in the corresponding update area of each of the file sets, and then storing the modifications of the original data in selected portions of the general data area of each of the file sets when the corresponding update area has been filled with the modifications. The selected portions of the general data area include portions of the general data area into which no original data has been stored.

In a storage system of a data processor containing a plurality of volumes, a method in accordance with this invention of storing a plurality of files onto the volumes so that the files may be accessed in a time efficient manner comprises several steps performed by the data processor. The files are organized into file sets, and the data processor includes a storage allocation file which correlates each of the file sets with the amounts of storage in the volumes. The steps of the method include creating at least one of the files to be stored into a corresponding one of the file sets and allocating an additional portion of the volumes for storage of the created files so that the additional portion of the volumes is of sufficient size to allow the corresponding file set to be stored onto the volume without fragmentation, except as is required by the physical constraints of the volumes. The remaining steps of this method are filling the allocated additional portion with the created files, and modifying the storage allocation file to correlate the additional portion of the volumes and the corresponding file set.

A method of maintaining a plurality of services in a storage system of a data processor in accordance with this invention also comprises several steps performed by a data processor. The steps include setting timers for each of the surfaces to reflect a time when the data was stored on the surfaces, and comparing those timers to corresponding predetermined thresholds to determine whether time-out conditions have occurred for the surfaces. This method also includes the step of setting a corresponding indicator for each of the surfaces for which the time-out condition has occurred.

The accompanying drawings, which are incorporated in and which constitute a part of this specification, illustrate one embodiment of the invention and, together with the description, explain the principles of the invention.

BRIEF DESCRIPTION OF THE DRAWINGS

FIG. 2A is a diagram of various elements of a storage system which can be used in accordance with this invention;

FIG. 5 is a table which summarizes the allocation of storage in accordance with the method shown in FIG. 4;

DESCRIPTION OF THE PREFERRED EMBODIMENT

Reference will now be made in detail to a presently preferred embodiment of this invention, an example of which is illustrated in the accompanying drawings.

A. File Organization

Figure 1:
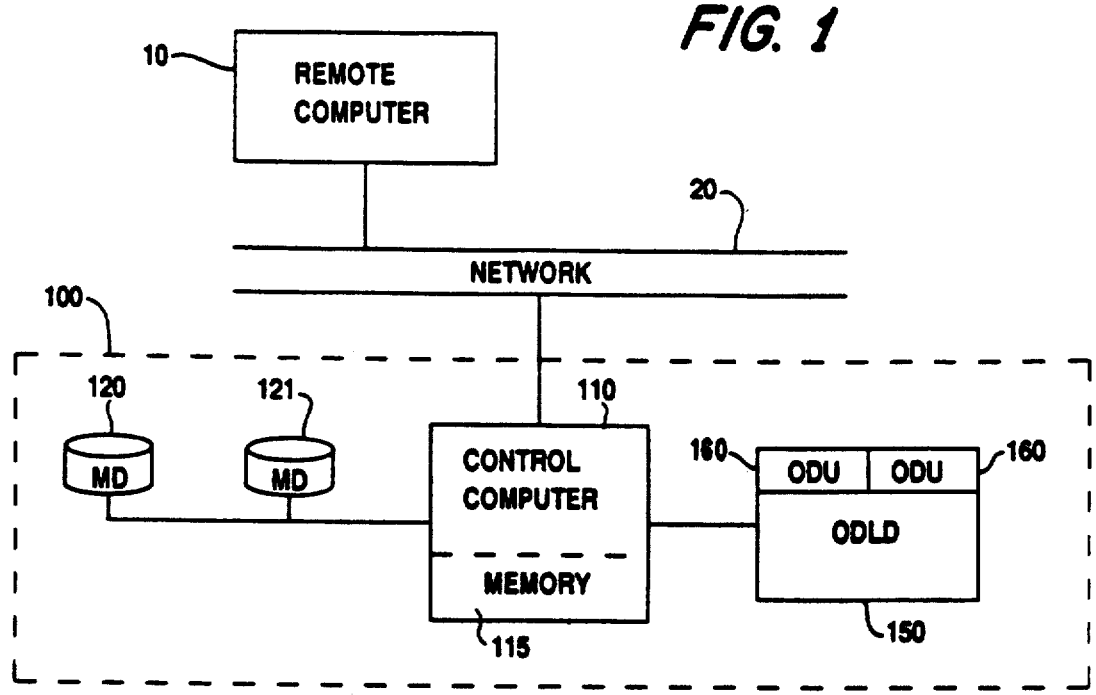
FIG. 1 is a drawing of a computer system on which the method of this invention can be executed.

FIG. 1 shows a data processing system 100 which can provide an environment for implementing the methods of this invention. System 100 is preferably a computer system which can act alone or as the controller of a storage system used by other computers, such as remote computer 10 which accesses system 100 over network 20. Data processing system 100 includes a control computer 110 having an internal memory 115. Preferably several magnetic disc drives 120, 121 are coupled to control computer 110, as is an optical disc library device (ODLD) 150 containing optical discs units ODUs (160). ODUs 160 each contain one or more optical discs onto which the data is stored.

Data processing system 100 in FIG. 1 is not the only system with which the present invention can operate. It merely represents one of several environments with which the present invention has applicability.

FIG. 2A shows the elements of an embodiment of the storage system organized in accordance with the present invention. The entire storage system 200 is preferably a library which resides as in ODLD 150. Contained in that library are several volumes, shown in FIG. 1 as volumes 211, 212, and 213; volumes 221, 222, and 223; and volumes 231, 232, and 233. Each volume is treated as a dismountable unit of storage which is identified by a unique volume identification code. Each volume also usually contains two physical surfaces.

The volumes can be grouped into a plurality of nonoverlapping volume sets, such as volume set 210 which contains volumes 211, 212, and 213; volume set 220, which contains volumes 221, 222, and 223; and volume set 230, which contains volumes 231, 232, and 233. The volume sets are designed to contain a set of logically-related data, such as for a department of a business.

System 200 treats each volume set as a single unit. Volume sets have unique names within system 200 and can have fixed sizes which are integral numbers of volumes. Volume sets can also be initially created with no volumes. Those empty volume sets must be extendable, however. Volume sets which are extendable can also have an upper limit representing the maximum number of volumes to which the volume set can be extended. If the size of the volume set and the volume set size limit are the same, the volume set cannot be extended. If the volume set size limit is zero, however, indicating that the limit is unspecified, the volume set size is unlimited.

Figure 2B:
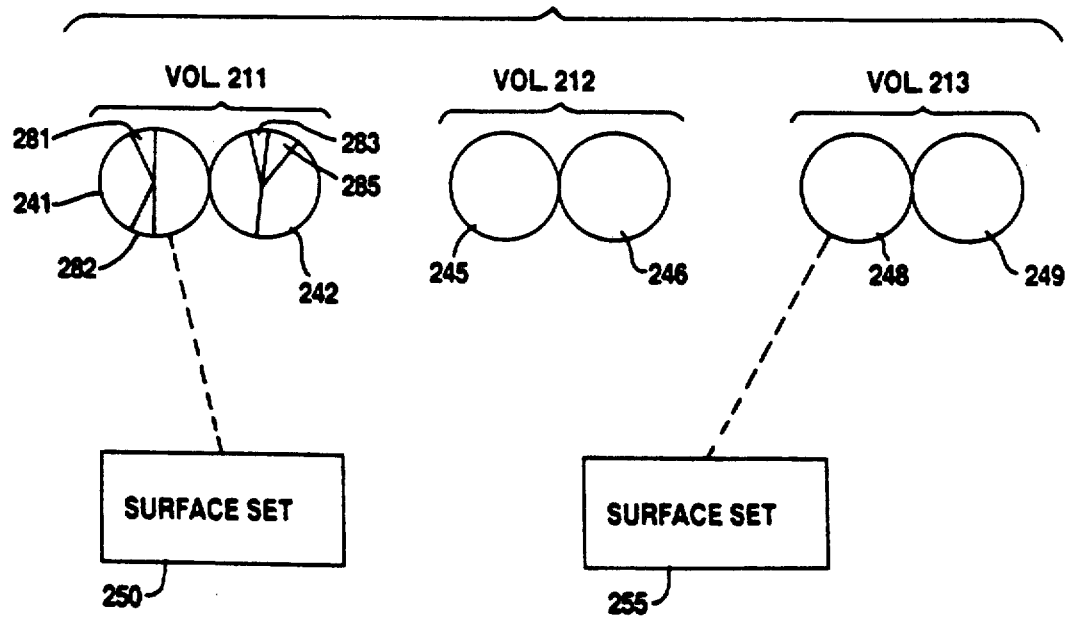
FIG. 2B is a more detailed diagram of certain of the elements of the storage system shown in FIG. 2A.

The volumes can have surfaces, which are shown in FIG. 2B in unfolded form as surfaces 241 and 242 of volume 211, surfaces 245 and 246 of volume 212, and surfaces 248 and 249 of volume 213. As explained above, optical discs generally contain two surfaces. With current technology, both surfaces cannot be accessed at the same time.

FIG. 2A shows files 261, 262, 263 as one of the more detailed elements in storage system 200. In storage system 200, files contain data which can be further organized, such as into records and frames as described in U.S. patent application No. 053,823. In general, a file is a named collection of logically-related data located on some storage media which is treated as a unit.

Files can be organized into file sets, such as file sets 260 and 270 as shown in FIG. 2A. In FIG. 2A, file set 260 contains the files 261, 262, and 263. File sets are designed to contain a logically-related subset of the data in the corresponding volume.

A file set can be composed of storage on several different volume surfaces within a volume set. Each of the file sets resides on the volumes of the corresponding volume set, and each file set has a unique identification within the corresponding volume set. Therefore, file sets are generally identified both by volume set name and file set name.

File sets can have an allocated size or can be initially allocated to have a size of zero. The allocated size of a file set is the number of bytes of storage that must be set aside for the file set when it is created. File sets can also have a size limit representing the maximum number of bytes to which the file set can be extended. When the allocated size of the file set and the size limit are the same, the file set cannot be extended. File sets with zero size, however, must be extendable because no storage is initially set aside for the file set when it is created.

The other elements of the structure shown in FIGS. 2A and 2B are surface partitions, also called partitions, shown in FIG. 2A as 291, 295, and 297, and in FIG. 2B as 281, 282, 283, and 285. A partition is that portion of a surface which is dedicated to a single file set. Thus, the portion of a file set which resides on any particular surface is a surface partition of the file set, and a file set is a collection of surface partitions, each one on a separate volume surface.

Looking at partitions another way, each surface can be divided into several surface partitions belonging to a different file set, each surface partition containing files from the corresponding file set. Thus, several file sets may have surface partitions on a particular surface.

The collection of all the surface partitions that reside on a particular surface is a surface set. Therefore, a surface set describes how a particular volume surface is allocated to file sets. In FIG. 2B, surface set 250 is for surface 241 and surface set 255 is for surface 248. FIG. 2A shows surface sets 258 and 259 as elements of volume set 210.

As shown in FIG. 2B, partitions 281, 282 reside on surface 241 (and are part of surface set 250) and partitions 283 and 285 reside on surface 242. In FIG. 2A, partition 291 is shown as belonging to file set 260 and surface set 258. Partition 295 is shown as belonging to file set 270 and surface set 259. Partition 297 is shown as belonging to file set 260 and surface set 259.

All of the partitions need not occupy an entire surface; some of the surface may remain free for extending partitions. Furthermore, all of a partition from a surface need not be allocated to files in the file set; some portion of the partition may remain free for future files. Free storage in one partition corresponding to one file set, however, cannot be allocated to files in a different partition corresponding to a different file set.

File sets can be either contiguous or noncontiguous depending upon the whether the access of files is desired to be time efficient or space efficient. A contiguous file set is composed of multiple, entire surfaces or is contained wholly within one surface. As will be explained in more detail below, contiguous file sets provide time-efficient storage by insuring that the files in the file set are on as few surfaces as possible thereby reducing the number of different surfaces that must be accessed when accessing different files or parts of a file. Noncontiguous file sets promote space efficiency because the file set only consumes from a surface what is actually needed for the file and does not set aside space on the surface for future files. This results in several noncontiguous file sets obtaining storage from the same surface and filling it. A noncontiguous file set that is no larger in size than a single surface could be placed on many surfaces.

A file set is both a collection of surface partitions and a collection of related files. A surface set is a description of the allocated and unallocated storage on a particular surface. Since a volume set is a collection of surfaces, it is also both a collection of surface sets and a collection of file sets. All of the surface partitions in each file set of a particular volume set reside on the surfaces of the volumes in that volume set. The entire system is a collection of volume sets, and therefore volumes, which are located at the same site.

Volume sets are the technique used to manage the collection of volumes. Each volume set is managed separately from other volume sets. Similarly, file sets are used to manage collections of files, and each file set is managed separately from each other, except as they are part of the same volume set.

In general, file sets should not be placed on both sides of the same volume because file sets contain related data and both sides of a volume cannot be read simultaneously. Thus use of a file set stored on both sides of the same volume might require continual removal and insertion making access to the logically-related subset of data in the file set very inefficient. If the file set data on the first surface of a volume is obsolete or infrequently accessed, however, the file set can extend to the other surface.

The storage system shown in FIGS. 2A and 2B is extendable to avoid running out storage space. Not only can storage for files be reserved by preallocating storage for file sets and volume sets, but the volume sets and file sets can also be dynamically increased.

Dynamic adjustment of volume sets is very easy with this invention. Empty volumes added to system 200 ar first placed in a free volume set, which is a collection of empty volumes that have not yet been assigned to a specific volume set. When a volume set is created or extended, it obtains volumes from the free volume set. If the number of volumes in the free volume set falls below a predetermined threshold number, the operator is notified to add empty volumes to the free volume set. As volumes become full or expire because their information is obsolete, those volumes may be removed from the volume set. Also, unwritten volumes in the volume set can be freed from the volume set by decreasing the volume set size or by indicating that the system should release all unwritten volumes from a volume set.

File sets may also be dynamically adjusted. File sets are created in a volume set using partitions on surfaces in that volume set. If a file set grows and if there is insufficient free storage in the volume set, another volume is moved from the free volume set to that specific volume set. Unwritten storage can be released from the file set by decreasing the file set size or by indicating that the system should release all unwritten storage from a file set.

Thus the method of this invention provides two key characteristics: dynamic expandability of selected file sets during storage of data by allocation of additional portions of the volumes in the corresponding volume set and dynamic expandability of the number of volumes in the corresponding volume set during storage of the data by assignment of additional, non-allocated volumes to the corresponding volume set. One advantage of dynamic expandability is that it removes the need for operator involvement. Indeed, with the automatic robot-controlled optical device units currently available, operators are not even needed to place the optical disk volumes into the optical disc units.

B. Storage Allocation Manager

To manage all these capabilities and characteristics, central control computer 110 preferably executes a storage allocation manager program stored in memory 115. The storage allocation manager is a program which accesses several storage allocation management files stored on magnetic discs 120 and in memory 115.

The storage allocation manager is in charge of maintaining files to indicate the location of free space on the different volumes. Preferably when a file set is created, the storage allocation manager allocates one or more surface partitions for the file set. When a file set is extended, the storage allocation manager either extends existing partitions or creates new partitions. The storage allocation manager often uses trial and error techniques to locate storage for the surface partitions.

Usually the newly created file set or the file set extension must be divided into smaller portions to fit into the available storage in the volume set. If sufficient storage cannot be found, the storage allocation manager must add volumes to the volume set.

Figure 3:
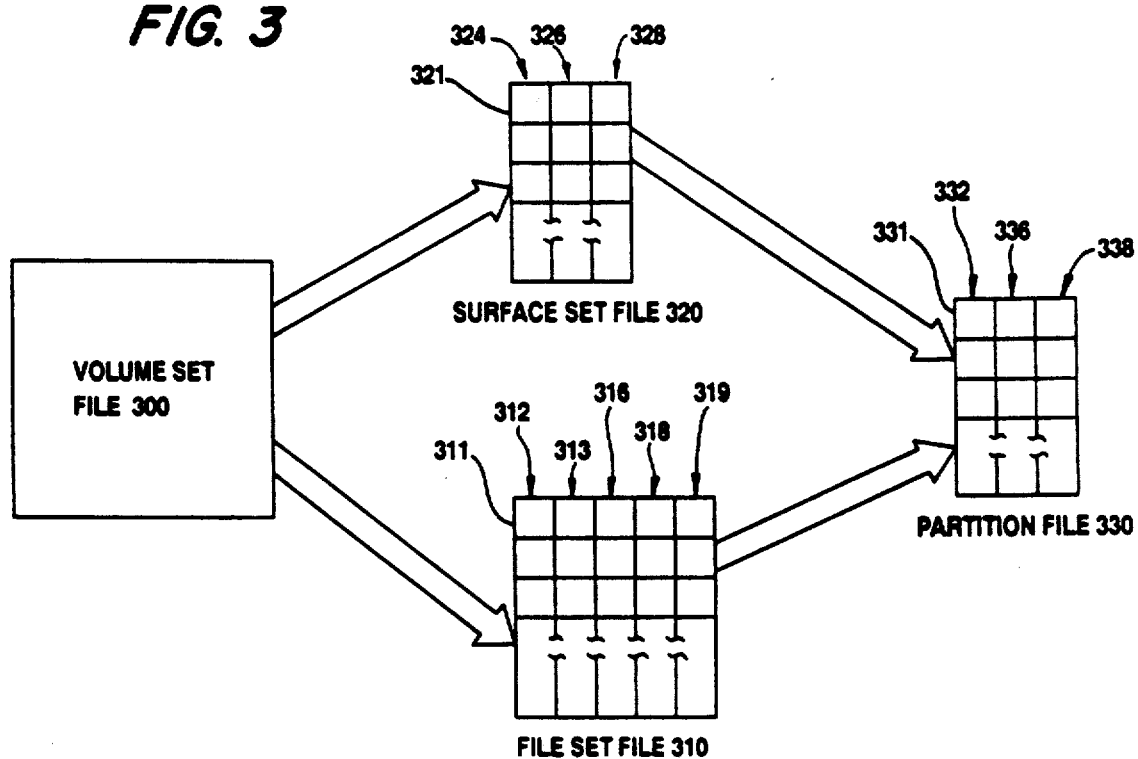
FIG. 3 is a schematic drawing of the different files which are managed by the storage allocation manager.

FIG. 3 shows different storage allocation files to which the storage allocation manager refers in making the allocation decisions. These files are not to be confused with the files which make up the file sets shown in FIG. 2A. Instead the storage allocation files, which are stored on magnetic discs 120, are basically tables which the storage allocation manager accesses to keep track of allocated storage. The files shown in FIG. 3 are volume set file 300, file set file 310, surface set file 320 and partition file 330. Volume set file 300 contains references to file set file 310 and surface set file 320, and file set file 310 and surface set file 320 both contain references to partition file 330.

File set file 310 contains an entry, e.g., entry 311, for each file set, and that entry includes a size limit value 312, a size value 313, a general allocated value 316, and an update allocated value 318 as well as other values 319. Size limit value 312 sets the limit on the size of the file set. If the size limit value 312 is zero, indicating that the limit is unspecified, the file set size is unlimited. Size value 313 indicates the amount of storage that can be allocated to the files in that file set without extending the file set. When the file set is extended, the size value increases accordingly. Size value 313 is equal to the sum of the sizes of all the partitions for the corresponding file set.

General allocated value 316 is the amount of storage that has been allocated to the general files in the file set.

Update allocated value 318 is the amount of storage that has been allocated to the update files which contain modifications to the general files in the file set. When new storage is allocated for a general file or an update file, general allocated value 316 or update allocated value 318 increases accordingly. The sum of general allocated value 316 and update allocated value 318 cannot exceed size value 313.

Surface set file 320 contains an entry, e.g., entry 321, for each surface. Each entry includes a size value 324 and an allocated value 326 as well as other values 328. Size value 324 indicates the amount of storage that has been assigned to the partitions in the surface set and equals the sum of the sizes of all of the partitions in the particular surface set. Allocated value 326 is the amount of storage that has been allocated to the file sets in the surface set, and it equals the sum of the sizes of all of the general areas and update areas allocated in the partitions in the surface set. When storage is allocated for a general file or an update file, allocated value 326 increases accordingly. Allocated value 326 cannot exceed size value 324.

Partition file 330 contains an entry, e.g., entry 331 for each surface partition. Each entry includes a size value 332 and an allocated value 336 as well as other values 338. Size value 332 indicates the amount of storage that can be allocated to files in the particular partition without extending that surface partition. When the partition is extended, its size value is increased accordingly.

Allocated value 336 is the amount of storage that has been allocated to files in the partitions. When storage is allocated for a file, allocated value 336 is increased accordingly. The allocated value cannot exceed the size value.

When the storage allocation manager is searching for storage for a file set, it considers several variables. One variable is the file set size, which indicates the initial size of the file set. When the file set is originally created, the storage allocation manager searches for surfaces in the corresponding volume set that can provide a combination of surface partitions, one on each surface, which satisfy this size requirement.

Another variable to be considered in the search is the type of initial allocation, which can be contiguous or noncontiguous. These allocation types are described in detail below. Briefly, contiguous allocation is designed to ensure that the file set resides on a minimum number of surfaces in order to save time when accessing that file set. Noncontiguous allocation is designed to make efficient use of available space on the surfaces.

For extensions of noncontiguous file sets, additional storage may be located on any surface in the volume set. The storage allocation manager first searches the surfaces on which the file set is already assigned storage and, if sufficient storage is not found, the storage allocation manager next searches the other surfaces in the corresponding volume set.

For extensions of contiguous file sets, additional storage is located in the storage reserved for the file set if the storage allocation manager reserved sufficient storage during initial allocation. If the storage allocation manager reserves insufficient storage, the manager will reserve additional storage at the time of extension up to the file set size limit or up to an integral number of surfaces which will hold the extension, whichever is less.

For extensions of noncontiguous file sets, the size of the file set is increased by the size of the file to be added to the file set. For extensions of contiguous file sets, the size of the file set is increased by the size of the surface or surfaces added to the file set. In either case, the size cannot be increased beyond the file set size limit.

The last variable used by the storage allocation manager is the file set size limit, which is the limit on the size of the file set. For either type of file set, the limit is an upper bound on the size of the file set. If the limit is set to zero, the file set size limit is unspecified and thus the file set has no limit. Also, if the size limit is zero, all of the available storage on the last surface is reserved. The limit can be reduced, but not to a value less than the size of the file set at the time.

C. Time Efficient and Space Efficient Variable Mechanisms

Contiguous and noncontiguous allocation can be more easily understood from an appreciation of the results obtained from such allocation. File sets can be allocated either for time efficient access, which corresponds to contiguous allocation, or for space efficient allocation, which corresponds to noncontiguous allocation. Time efficient allocation minimizes the number of surface partitions for a particular file set. Space efficient allocation maximizes the amount of space of each surface which is allocated. Time efficient allocation is designed to reduce the amount of time needed to access the files in a file set, because it guarantees that the file set is stored on a minimum number of surfaces. Space efficient storage is designed to minimize the total number of surfaces used for all file sets within the volume set. For time efficient allocation, the storage allocation manager only allocates storage space when the file set can be entirely contained on the minimum number of surfaces. For space efficient allocation, the storage allocation manager allocates the first available free space, and continues to allocate space on the other surfaces until space for the entire file set is allocated. Time efficient allocation is called "contiguous" because most of the allocated storage will be contiguous on the same surface(s). Space efficient allocation is termed "noncontiguous" because it often results in fragmenting file sets across several surfaces.

Figure 4:
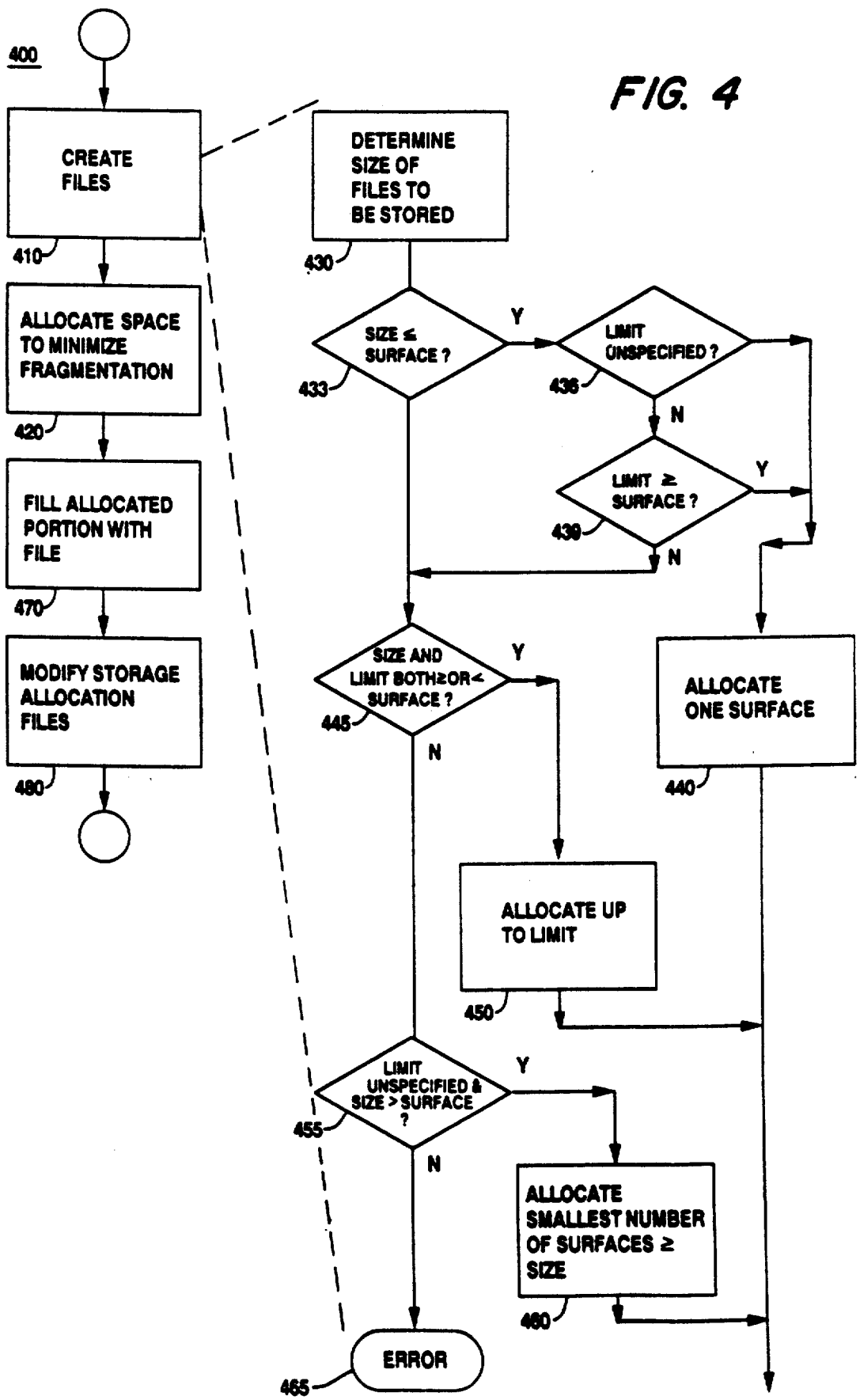
FIG. 4 is a flow diagram outlining a method of storing files in a time-efficient manner.

FIG. 4 shows a flow diagram 400 of a preferred method of allocating storage in accordance with the time efficient, or contiguous allocation methods. The method can be used either for initial allocation or for extensions. Preferably in such a method, there are several surfaces and the sizes of all the surfaces are the same. It is assumed that each of the file sets is associated with a size limit which may be zero, indicating that the limit is unspecified (i.e., unlimited). Although the description is directed to a system of write-once media, the present invention also has advantages for systems of erasable media.

First, one or more files are created to be stored into a corresponding file set (step 410). Such creation can either occur at the central control computer 110 in FIG. 1 or at a remote computer 10 which is accessing system 100.

The next step is to allocate additional portions of the volumes containing the file set into which the data is stored (step 420). The allocation should be such that the additional portion of the volumes are large enough to allow the corresponding file set to be stored on the volume without fragmentation, except as is required by the physical constraints of the volume. One such constraint is that the file set may be larger than the surface size. In such a case, fragmentation cannot be avoided.

As illustrated in FIG. 4, such allocation is preferably carried with several substeps. The first substep is to determine the total size of the files to be stored into the file set or file set extension (step 430). If the determined size of the file set or extension is less than or equal to the size of the surface (step 433), and if the size limit of the file set is either unspecified (step 436) or is greater than or equal to the size of the surface (step 439), then the additional portion to be allocated will be one surface (step 440). This is because one surface is the minimum amount of storage space which will guarantee that the file set can be stored without fragmentation.

If the determined size and the size limit are both either smaller than or greater than the surface size (step 445), then the allocated portion will be equal to the size limit (step 450). This follows because if both the determined size and the size limit are less than the surface size, the file set can be completely stored on a single surface. Similarly, if both the determined size and the estimated size are greater than the surface size, then allocation of a single surface will not meet the storage needs, and the smallest amount of storage space which can contain the files is the size limit.

If the size limit is unspecified or zero, and therefore the file set is unbounded, and the determined size is larger than the surface size (step 455), then sufficient surfaces must be allocated to contain the file sets or extensions completely. Thus, the allocation is the smallest number of surfaces which is greater than the determined size (step 460). If none of these conditions exist, there is some sort of error (step 465).

This allocation is summarized by table 500 in FIG. 5. As can be seen, for each of the possible combinations, the time efficient allocation method ensures that sufficient size is allocated to ensure contiguity.

The remaining steps in the method involve filling the allocated portion with the created files (step 470) and modifying the storage allocation files to correlate this additional allocated portion of the volumes and the file sets containing the created files (step 480). Such modification involves entering the newly allocated partition sets into the storage allocation files shown in FIG. 3 and updating those files. Similarly, the file set file and surface set file must be updated in accordance with the allocation, which thereby also updates the volume set file.

Figure 6:
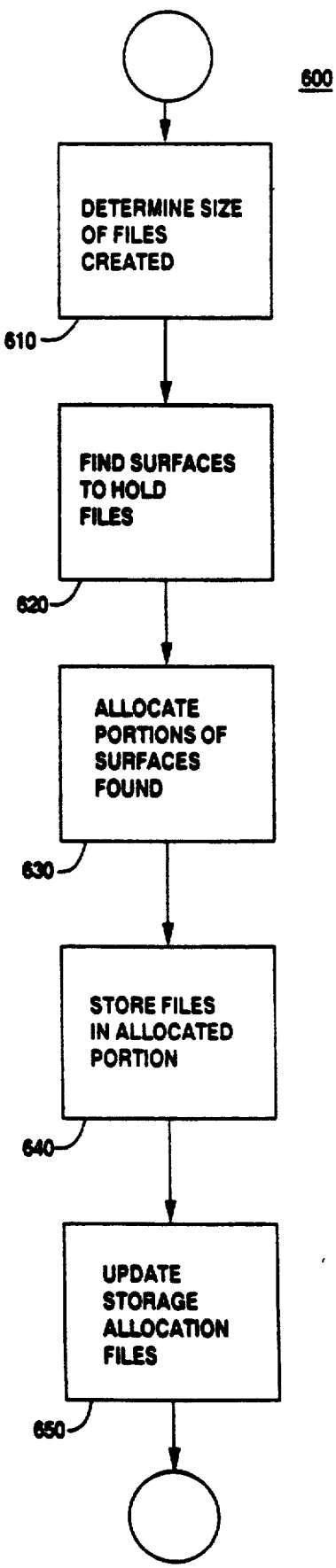
FIG. 6 is a flow diagram for a method of storing data in a space-efficient manner.

FIG. 6 shows a flow diagram 600 of the preferred method of allocation for the space efficient method of allocation. In this method, the first determination is the size of the additional portion to be allocated to contain files (step 610). Next, the surfaces are examined to find those surfaces that have unallocated portions which can contain the files within whatever constraints are present (step 620). The next step is to allocate the unallocated portions of the surfaces found to the corresponding file set (step 630). The last two steps involve storing the files (step 640) and updating the storage allocation files shown in FIG. 3 to reflect the allocation according to this technique (step 650).

D. Update Areas

Because write-once media cannot be overwritten or updated, several problems arise because it is not always possible to predict how much updating will occur. Although one may be able to predict that, on the average, a certain percentage of original data will be modified for a file or a file set, such predictions do not necessarily apply to each particular file. Therefore, it is difficult to plan for updates.

The present invention addresses this issue by intelligent management of update areas for such modifications. In accordance with the present invention, the allocation of update areas, and the procedures to be followed with regard to such update areas, are followed at the file set level. This is not required, however, and the procedures will also work at the file and volume set levels as well.

Figure 7:
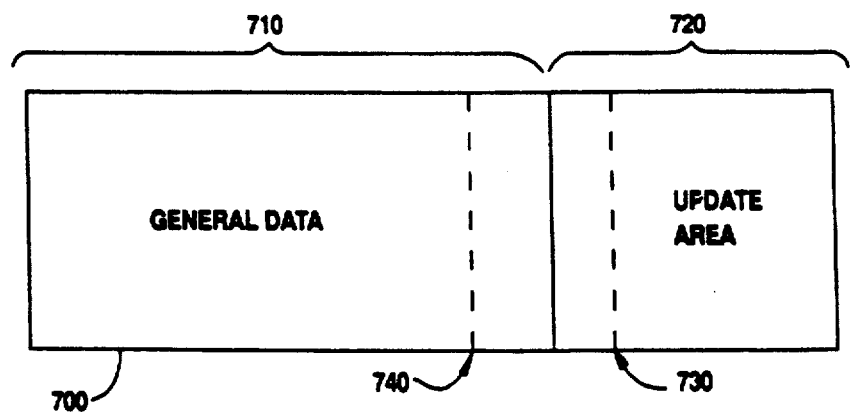
FIG. 7 is a diagram of general data areas and update areas in accordance with this invention.

FIG. 7 shows an example of a file set 700 allocated in accordance with this invention. File set 700 includes a general data area 710 and a corresponding update area 720. The general data area 710 is the area of the file set into which original data is initially stored in the file sets. The update area 720 is the area into which modifications of that original data are stored. Preferably, each of the partitions is similarly divided into a general data area and a corresponding update area.

Ideally, the modifications to a file on a particular surface are stored on that same surface because such storage minimizes the access time for that file by eliminating the time required to search additional surfaces for the modifications. Problems occur, however, if the modifications exceed the update area. This condition could occur either due to poor planning or just statistical variations. In such cases, decisions must be made regarding placement of those modifications to minimize additional search time.

Figure 8:
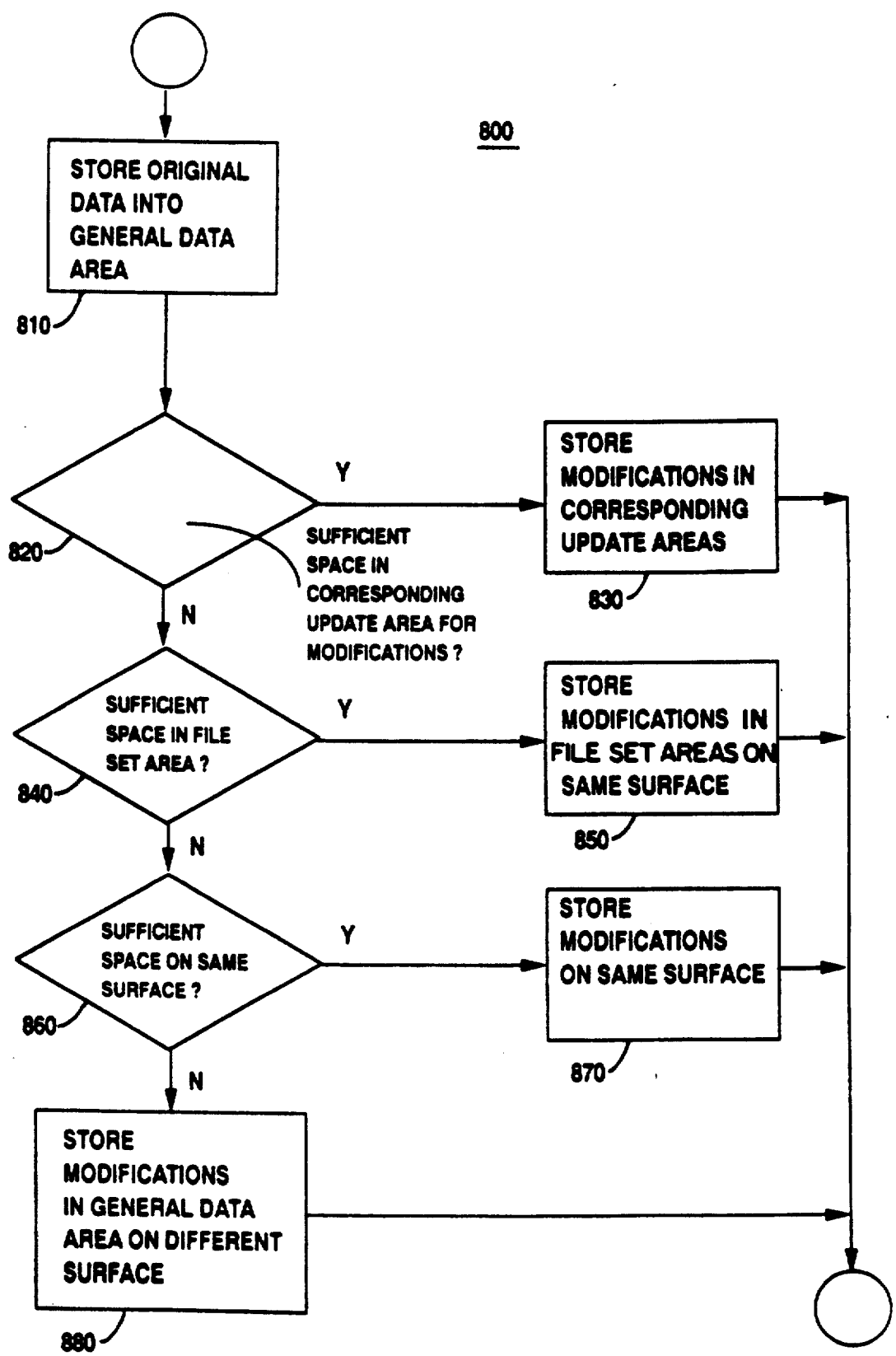
FIG. 8 is a flow diagram of a method of storing modifications to initially-stored data in accordance with this invention.

FIG. 8 shows a flow diagram 800 of a method in accordance with the present invention for storing original data and modifications onto surfaces in a file set to maximize efficiency. First, as expressed above, the original data contained in a general file is stored into the general data area (step 810). Update files containing modifications to the general files are placed, if possible, on the same surface as the general files they are updating. An initial determination is made to see whether the corresponding update area has sufficient space to store modifications contained in the update file (step 820). If it does, then the modifications are stored to the corresponding update area (step 830).

If the size of an update file exceeds the storage available in the update area on that surface, then the file can be stored using any available storage in the file set on that surface. Thus, the next determination is whether the update area together with the general data area on that same surface (i.e., the file set area) has sufficient space to store the modifications (step 840). If so, then the modifications are stored in the file set on the same surface (step 850).

If there is insufficient storage space left in the general data area and the update area on that same surface, the next determination is whether there is any free storage left on that same surface which, together with the update area and the general data area, will hold the modifications to the data (step 860). If so, then the size of the file set on that surface is increased by increasing the partition size from the surface's free storage, and the modifications are stored on the surface (step 870).

If the modifications cannot be stored on the same surface as the original data which is to be modified, then the modifications are stored to a general data area on a different surface in the file set (step 880). The general data areas of different surfaces are used rather than the update areas to avoid a "domino effect" of diminishing update areas on successive surfaces. It is preferable to store excess modifications to other general data areas and therefore have a smaller general data area to store original data because the modifications to the original data in that smaller general data will likely be stored on the same surface as the original data.

This invention thus maximizes the storage of the modifications in the same partition, or at least in the same surface as the original data to minimize search time for modifications. Storage of modifications to a different surface may sometimes be unavoidable, but placing those modifications in the general data areas of other surfaces increases the chances that modifications on those other surface will not need to be placed on still other surfaces.

At least for file sets, it is preferred that the ratio of the update areas to the general data areas be fixed for file sets to reflect a predicted percentage of modifications to be made to the original data. Such a percentage is a statistical value across all of the files in the file sets, and does not necessarily relate to a particular file. If such a percentage is used, the total allocation needed for maintaining update areas can be calculated from the size of the storage and the update percentage. If S represents the total size of the storage, G represents the size of the general data area, and U represents the size of the update area. Then $$S = G + U$$

Assuming that the predicted ratio of update area to general data area or the predicted ratio of modifications to original data, is P, the size of the general data area G can be determined as follows:

$$S = G + P \cdot G \text{ or}$$

$$G = S/(1+P).$$

Using this equation, the total size of the storage area S can then be allocated to the general data area and the update area.

For extensions, the same type of allocation would need to be taken into account. Thus, when additional file space is needed for a general area, an additional percentage P of that area should be added for the update area.

The storage allocation manager must therefore also keep track of the size of the update areas. If the update area ever extends past the original allocated update area, the general data area size must be decreased by that same amount to ensure that storage of original data does not overwrite modifications.

Another problem occurs if the update percentages are either increased or decreased. If the update percentage is decreased, shown diagrammatically by the dotted line 730 in FIG. 7 there is generally no problem unless the amount of updates has already been extended into the general data area. In such a case, the storage allocation manager must be aware that the general data area cannot increase the full amount, but only up to the area that contains the updates. If the update percentage is increased, however, shown diagrammatically by dotted line 740 in FIG. 7, the storage allocation manager must insure that the increased update area not encroach upon any portion of the general area that already contains original data.

As is apparent, the free areas for files in a file set may not be calculated from the fields of the file set's record. This is because the general data area may already have encroached upon the update area in partitions for which the update percentage has increased, or the update area may have already encroached upon the general data area if the update area is decreased or if the modifications exceeded the update area. The file set has no way of discerning these conditions. Therefore the method of allocation of free storage must be designed to accomodate these conditions.

If there were no update areas, then the free storage, F, would be calculated as follows:

$$F = S - G$$

where, as before, S equals the size of the file set and G equals the size of the general data area.

If there are update areas and the modifications to the original data stay within the update areas, then the computation of free storage is $$F = S - G - U,$$

where, as above, U represents the size of the corresponding update area.

If the update area has encroached upon the general data area, then the computation for the amount of free memory is $$F = S - G - Ud,$$

where Ud is the size of the update itself, rather then the update area.

These cases can be combined into the single function:

$$F = S - G - max\ (Ud,\ U),$$

where the function max indicates the maximum of the following values.

The determinations are complicated further if a change in the ratio P has allowed the general data to encroach upon the update area. In such a case, the computation above would yield a negative number. To avoid this situation, the complete equation for the amount of free space calculation is $$F = max\ (S - G - max\ (Ud, U), 0).$$

This equation takes into account the encroachment of the general data area into the update area and indicates that the minimum free space value F for that condition will be 0.

The amount of free storage in the update area can be determined in a similar manner as the size of the update area minus the allocated update area. If, however, the allocated updates have exceeded the update area, there is zero free space in the update area. Thus, the amount of free space in the update area, Fu, is calculated as follows:

$$Fu = max\ ((U - Ud), 0).$$

The determination of free space is important for the allocation methods discussed above. Those allocation methods must also take into account the update areas. When a file set is extended, additional update storage must be set aside. The amount of the extended update storage to be added to the file set extension is the percentage of the extension itself.

If a file set is reduced, some or all of the free or unallocated general areas are taken away If the update area is defined as a percentage of the general area, the update area is reduced when the general area is reduced, preferably by the ratio, P of the general area reduction The amount of the update area to be reduced may not always available, however, because it may have already been allocated. If there is not enough unallocated update area to meet the proportionate reduction, then whatever update areas are unallocated is taken, and the additional modifications in those areas become part of the general data areas.

E. Timers

In addition to managing modifications, the system allocation manager and the entire memory system must ensure that obsolete information is removed to make room for current information.

Because the volumes of write-once media cannot be reused it is necessary to control both the placement of the volumes into an optical disc unit as well as the writing of data onto the disc. For example, if obsolete and current data are both written onto the same surface, or same volume, it is more difficult to remove that volume even though most of the data may be obsolete. Therefore, in accordance with the present invention, various timers are set for each of the surfaces to reflect a time that the data was stored on those surfaces, and those timers are compared to corresponding thresholds to determine whether time out conditions have occurred. If so, then corresponding indicators are set to indicate that the time out condition has occurred.

One of the timers is an expiration timer which indicates when the data has become obsolete. One example of obsolete data is accounting records which are not needed for business reasons or legal reasons after a certain number of years. Generally, expiration timers are set when the most recent of the data is stored onto the associated surface. The threshold for the expiration timers is preferably the same for all of the volumes in a particular volume set. In the preferred embodiment, this timer can be deactivated by setting the threshold to zero. Otherwise, when the expiration timers for the both surfaces of a volume exceed their respective thresholds, an obsolescence indicator is set which signals that the volume can be removed from the system.

Another type of timer is a cycle timer which is associated with the surfaces. The cycle timer indicates when the opposite surface of a volume can be used. If the activity on one surface is infrequent, the other surface can be used without having to continually flip the volume over. The cycle timer for a surface controls the length of time until data can be written on the opposite surface. Preferably, thresholds for the cycle timers apply to all of the surfaces in an entire volume set. If the threshold is set to zero, then this figure is ignored. When the cycle timer, which is set when the most recent of the data is stored onto the associated surface, exceeds the threshold, a cycle indicator is set. The cycle indicator signals that the corresponding volume can be flipped over so the other surface can be written.

A third type of timer is a deactivation timer which, unlike the other two timers, is set when the first of the data is stored onto the associated surface. The deactivation timer determines the range of time of information that will appear on any surface. The threshold for the deactivation timer specifies how long this surface should be kept active to prevent data that is too recent from being written onto the surface. Preferably, deactivation timer thresholds are the same for all of the surfaces in the volume set. When the deactivation time exceeds the threshold, a deactivation indicator is set which signals the end of further storage onto the corresponding surface. As with the other thresholds, a zero value indicates that this timer is ignored.

In summary, no data is written to a surface after the deactivation timer indicates that the desired time range of data is contained on the surface. When the cycle timer indicates that the data on one surface should be experiencing low activity, data can then be written to the opposite surface. After the expiration timer on both surfaces indicates that the data is obsolete, the volume can be removed.

Preferably, the values of the timers are stored on disc 120 or in memory 115 for ease of access by the storage allocation manager. For purposes of backup, however, the values of these timers are also stored on the optical disc volumes themselves.

F. Commands

The preferred embodiment of this invention recognizes a certain number of commands which can be used by an operator of the system to create and modify the file sets and volume sets for operation in accordance with this invention. For example, the CREATE FSET command causes the creation of a file set. With this instruction, an operator specifies names of the file set and volume set as well as the allocation type (i.e., contiguous vs. noncontiguous or time efficient vs. space efficient). The operator also specifies a limit value and a size value for the particular file set, as well as any update percentages. The CREATE FSET command not only creates a file set, but also allocates space to that file set and assigns initial attributes to the file set.

In a similar manner, the CREATE VSET command is a way of creating a volume set. Using this command, the operator specifies a name for the volume set, size limit values and values for the cycle timers, deactivation timers, and expiration timers. This command not only creates a volume set, but also allocates any required volumes to the set and assigns the initial attributes to the set.

The SET FSET command allows one to change a file set's size or attributes. This command requires the file set name, and allows an operator to change the originally-specified limit value, size value, and update allocated value for the corresponding file set. In addition, an operator can use this statement to release any free storage from this file set. When deallocation is specified, the storage allocation manager releases all unused general areas and all update areas, except for what is needed to meet the requirements of the update attribute. The storage allocation manager then returns the released storage to the volume set's free storage. If the identified file set had never been used, the storage allocation manager also removes the file set completely from the volume set.

Similarly, the SET VSET command allows an operator to change the volume set's size or attributes. With this command, an operator can change the values of the cycle, deactivation and expiration timers, as well as the limit and size values. Also, an operator can use this command to release volumes from the volume set. If the storage allocation manager receives such a command, it deallocates all volumes that have no space allocated to file sets and places those volumes in a free pool of empty volumes. If the storage allocation manager has deallocated all the volumes because none of the volumes has been used, the volume set is removed entirely from the library.

G. Summary

The present invention overcomes the problems of the prior art and achieves the objects of the invention by providing dynamic management information storage in a mass memory of write-once media. The invention provides dynamic expandability of file sets and volumes thus reducing the need for intervention of system personnel. Efficient storage is achieved by searching for and allocating storage based on the characteristics of the storage media, the characteristics of the files, the relationships between files, and future storage requirements. Problems associated with write-once media are overcome by efficient management of update areas and by providing timers for maintaining the volumes of write-once media.

Other embodiments of the invention will be apparent to those skilled in the art, from consideration of the specification and practice of the invention disclosed herein. It is intended that the specification and examples be considered as exemplary only, with a true scope and spirit of the invention being indicated by the following claims.

We claim:

1. A method of dynamically managing the storage of information in a mass memory of a data processor, said mass memory including a plurality of volumes and the method comprising the steps, performed by said data processor, of:

grouping selected ones of said volumes into a plurality of nonoverlapping volume sets, each one of said volume sets having an initial number of volumes and being designed to contain a corresponding set of logically related data;

organizing each of said volume sets into at least one file set which is designed to contain a logically related subset of said corresponding set of logically related data, each of said at least one file set having an initial size and residing on volumes of a corresponding one of said volume sets;

allocating to each of said at least one file set at least one portion of volumes of said corresponding one of said volume sets;

storing data for a selected one of said at least one file set into said allocated portion of said volumes of said corresponding one of said volume sets;

dynamically increasing the size of said selected one of said at least one file set during storage of said data by allocating additional portions of volumes of the volume set corresponding to said selected one of said at least one file set; and dynamically increasing the number of volumes in said corresponding one of said volume sets during storage of said data by assigning to said corresponding one of said volume sets additional ones of said plurality of volumes which have not been previously grouped into one of said volume sets.

2. The method of claim 1 wherein said volumes are volumes of write-once media, and wherein said storing step includes the step of storing said data into said volumes of write-once media.

3. The method of claim 1 wherein said storing step includes the substep of selecting one of a plurality of types of storage for said data, said plurality of types including time efficiency and space efficiency, storing said data according to the selected type.

4. The method of claim 1 further including the step of arranging each of said organized at least one file set into general storage areas for storing initially written original data and corresponding update areas for storing modifications to said original data; and wherein said storing step including the substeps of storing said original data only in the general data areas of said at least one file set, and storing said modifications to said original data into the corresponding update areas of said at least one file set.

5. The method of claim 4 wherein said storing step also includes the substep of storing, when said corresponding update areas are full, additional ones of said modifications to said original data into selected portions of corresponding general data areas which contain no original data.

6. The method of claim 1 wherein said allocating step includes the step of allocating said at least one portion based upon an associated size limit estimate for said corresponding at least one file set.

7. The method of claim 1 wherein said allocating step includes the step of allocating noncontiguous portions of said volumes in said corresponding one of said volume sets for one or more of said at least one file set.

8. The method of claim 1 wherein said initial number of volumes in each one of said volume sets can be zero, and wherein said step of dynamically increasing the number of volumes in the corresponding one of said volume sets includes the substep of increasing the number of said volumes without limit.

9. The method of claim 1 wherein said initial file set size can be zero, and wherein said step of dynamically increasing the size of said selected file set includes the substep of increasing the size of said selected file set without limit.

10. The method of claim 1 further including the steps of:

creating at least one file to be stored in a corresponding one of said at least one file set;

allocating an additional portion of said volumes according to a storage allocation file for storage of said at least one created file, such that said additional portion of said volumes is of sufficient size to allow said corresponding one of said file sets to be stored on said volumes without fragmentation except as required by physical constraints of said volumes;

filling said additional portion with said at least one created file; and modifying said storage allocation file to correlate said additional portion of said volumes and said corresponding one of said file sets.

11. The method of claim 10, wherein said volumes include write-once media.

12. The method of claim 10, wherein said volumes include erasable media.

13. A method of dynamically storing original data and modifications to said original data into file sets stored in a memory system for a data processor, said original data being data initially written into said file sets, the method comprising the steps, performed by said data processor, of:

assigning a general data area and a corresponding update area to each one of said file sets, wherein said assigning step includes the substep of assigning the general data area and corresponding update area of each one of said file sets such that a ratio of sizes of said general data area and said corresponding update areas equals a user-determined percentage for each one of said file sets;

storing said original data only in said general data area of each one of said file sets;

storing said modifications to said original data in said corresponding update area of each one of said file sets; and storing said modifications of said original data in selected portions of said general data area of each one of said file sets when said corresponding update area has been filled with said modifications, said selected portions of said general data area including portions of said general data area into which said original data has not been stored.

14. A method of dynamically storing original data and modifications to said original data into file sets stored in a memory system for a data processor, said original data being data initially written into said file sets, wherein said memory system comprises a plurality of volumes of memory media containing said file sets, and data is stored on surfaces of said volumes of memory media such that each of said file sets is stored on a corresponding collection of surfaces, the method comprising the steps, performed by said data processor, of:

assigning a general data area and a corresponding update area to each one of said file sets, wherein said assigning step includes the substep of assigning each general data area and said corresponding update area to one of said surfaces;

storing said original data only in said general data area of each one of said file sets;

storing said modifications to said original data in said corresponding update area of each one of said file sets; and storing said modifications of said original data in selected portions of said general data area of each one of said file sets when said corresponding update area has been filled with said modifications, said selected portions of said general data area including portions of said general data area into which said original data has not been stored.

15. The method of claim 14 wherein said step of storing said modifications to said original data in said corresponding update area includes the substep of storing said modifications to said original data in the corresponding update area on the one surface as the general data area containing the original data.

16. The method of claim 15 wherein the step of storing said modifications in said selected portions of said general data area includes the substep of storing said modifications in the general data area on the one surface that contains said corresponding update area which is full.

17. The method of claim 16 further including the step of storing, when said general data area is full, said modifications to said original data in an area of free storage on the one surface as said general data area containing said original data.

18. The method of claim 17 further including the step of storing said modifications in a general data area on a different one of said corresponding collection of surfaces when the general data area on said one surface is full and there is no free storage on said one surface as the general data area containing the original data.

19. A method of dynamically storing original data and modifications to said original data into file sets stored in a memory system for a data processor, said original data being data initially written into said file sets, wherein said memory system comprises a plurality of volumes of memory media containing said file sets, and data is stored on surfaces of said memory media such that each of said file sets is stored in a corresponding collection of surfaces, a portion of said surfaces storing data from the same file set being termed a surface partition, the method comprising the steps, performed by said data processor, of:

assigning a general data area and a corresponding update area to each one of said file sets, wherein said assigning step includes the substep of assigning each general area and said corresponding update area to one of said surface partitions;

storing said original data only in said general data area of each one of said file sets;

storing said modifications to said original data in said corresponding update area of each one of said file sets; and storing said modifications of said original data in selected portions of said general data area of each one of said file sets when said corresponding update area has been filled with said modifications, said selected portions of said general data area including portions of said general data area into which said original data has not been stored.

20. A method of dynamically managing the storage of information in a mass memory of a data processor, said mass memory including a plurality of volumes and the method comprising the steps, performed by said data processor, of:

grouping selected ones of said volumes into a plurality of nonoverlapping volume sets, each one of said volume sets having an initial number of volumes and being designed to contain a corresponding set of logically related data;

organizing each of said volume sets into at least one file set which is designed to contain a logically related subset of said corresponding set of logically related data, each of said at least one file set having an initial size and residing on volumes of a corresponding one of said volume sets;

allocating to each of said at least one file set at least one portion of volumes of said corresponding one of said volume sets;

storing data for a selected one of said at least one file set into said allocated portion of said volumes of said corresponding one of said volume sets;

dynamically increasing the size of said selected one of said at least one file set during storage of said data by allocating additional portions of volumes of the volume set corresponding to said selected one of said at least one file set;

dynamically increasing the number of volumes in said corresponding one of said volume sets during storage of said data by assigning to said corresponding one of said volume sets additional ones of said plurality of volumes which have not been previously grouped into one of said volume sets;

creating at least one file to be stored in a corresponding one of said at least one file set;

allocating an additional portion of said volumes according to a storage allocation file for storage of said at least one created file, such that said additional portion of said volumes is of sufficient size to allow said corresponding one of said file sets to be stored on said volumes without fragmentation except as required by physical constraints of said volumes;

filling said additional portion with said at least one created file;

modifying said storage allocation file to correlate said additional portion of said volumes and said corresponding one of said file sets, wherein each of said volumes have at least one surface, each of said surface having a same size, wherein each of said at least one file set is associated with a size limit, which may be unspecified, and wherein the step of allocating said additional portion includes the substeps of determining a total size of said at least one file to be stored;

allocating one surface as said additional portion if said total size is less than or equal to said surface size, and if the associated size limit is either unspecified, or is greater than or equal to said surface size;

allocating as said additional portion, a portion of said volumes equal to the total size up to the associated size limit if said total size and the associated size limit are both either smaller than or greater than said surface size; and allocating as said additional portion, the smallest number of surfaces which is greater than said total size if said total size is larger than said surface size and said associated size limit is unspecified.

21. The method of claim 20, wherein each of said at least one file set is selected for one of time efficient and space efficient storage and wherein the method includes the steps of:

determining, if said corresponding file set is selected for space efficient storage, a total size of said at least one file;

finding, if said corresponding file set is selected for space efficient storage, one of surfaces having unallocated portions at least as large as said total size; and allocating, if said file set is specified for space efficient storage, said unallocated portions to said corresponding file set.

22. The method of claim 20 or 21, wherein said volumes include write-once media.

23. The method of claim 20 or 21, wherein said volumes include erasable media.

* * * * *